July 21, 1942.
C. W. MOTT
2,290,245
POWER LIFT FOR IMPLEMENTS
Filed July 12, 1940
3 Sheets-Sheet 1
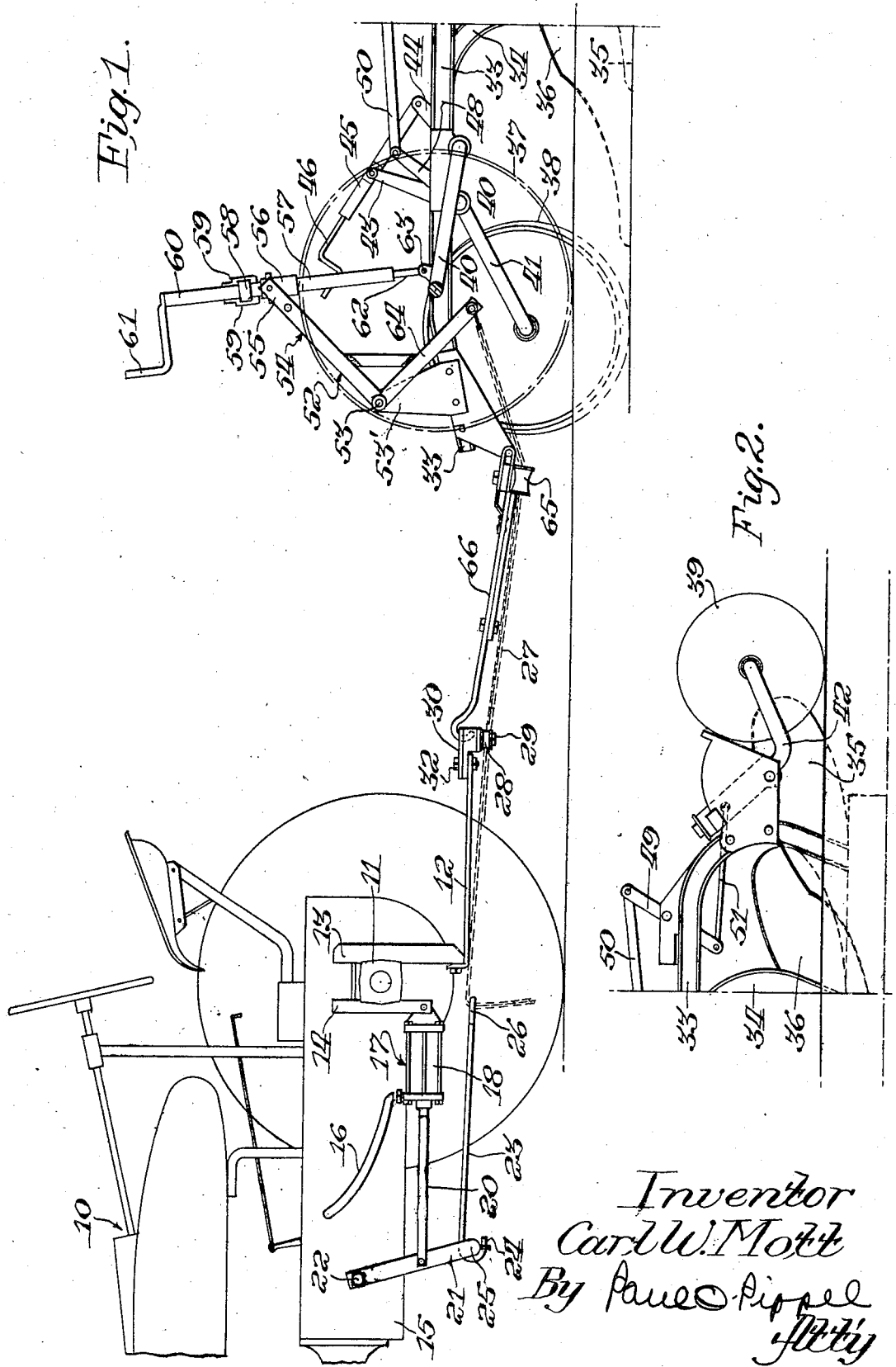
Inventor
Carl W. Mott
By Paul O. Rippel
Atty July 21, 1942.  C. W. MOTT  2,290,245
POWER LIFT FOR IMPLEMENTS
Filed July 12, 1940  3 Sheets-Sheet 2
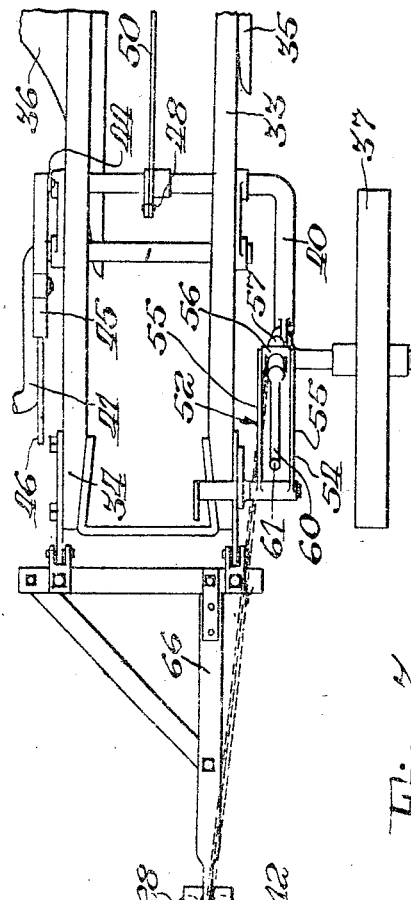
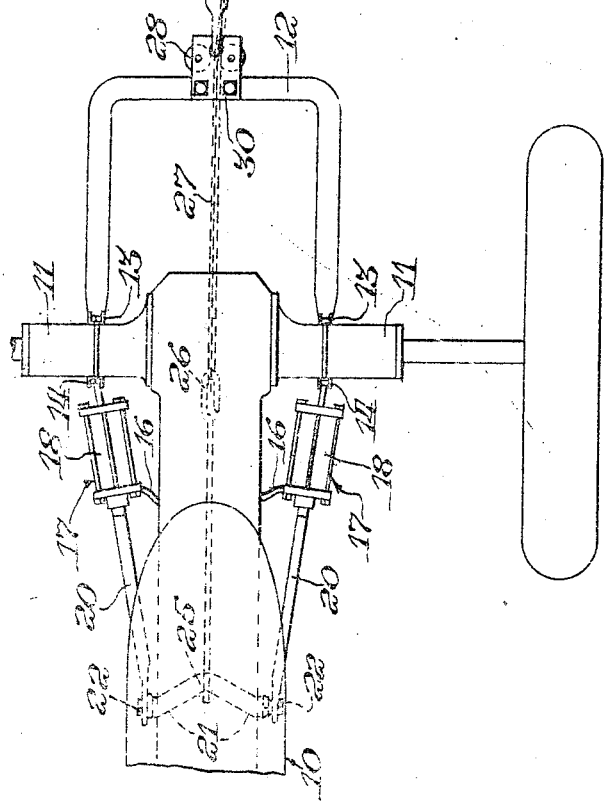
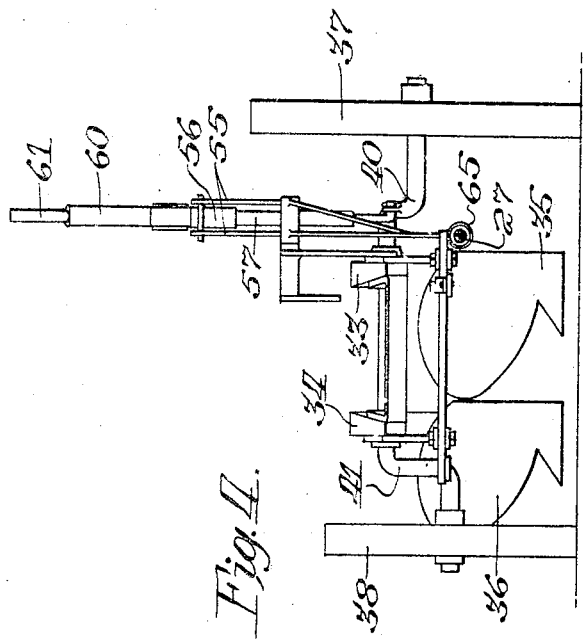
Fig. 3.
Fig. 4.
Inventor
Carl W. Mott
By Paul O. Pippel
Atty.

July 21, 1942.    C. W. MOTT    2,290,245
POWER LIFT FOR IMPLEMENTS
Filed July 12, 1940    3 Sheets-Sheet 3
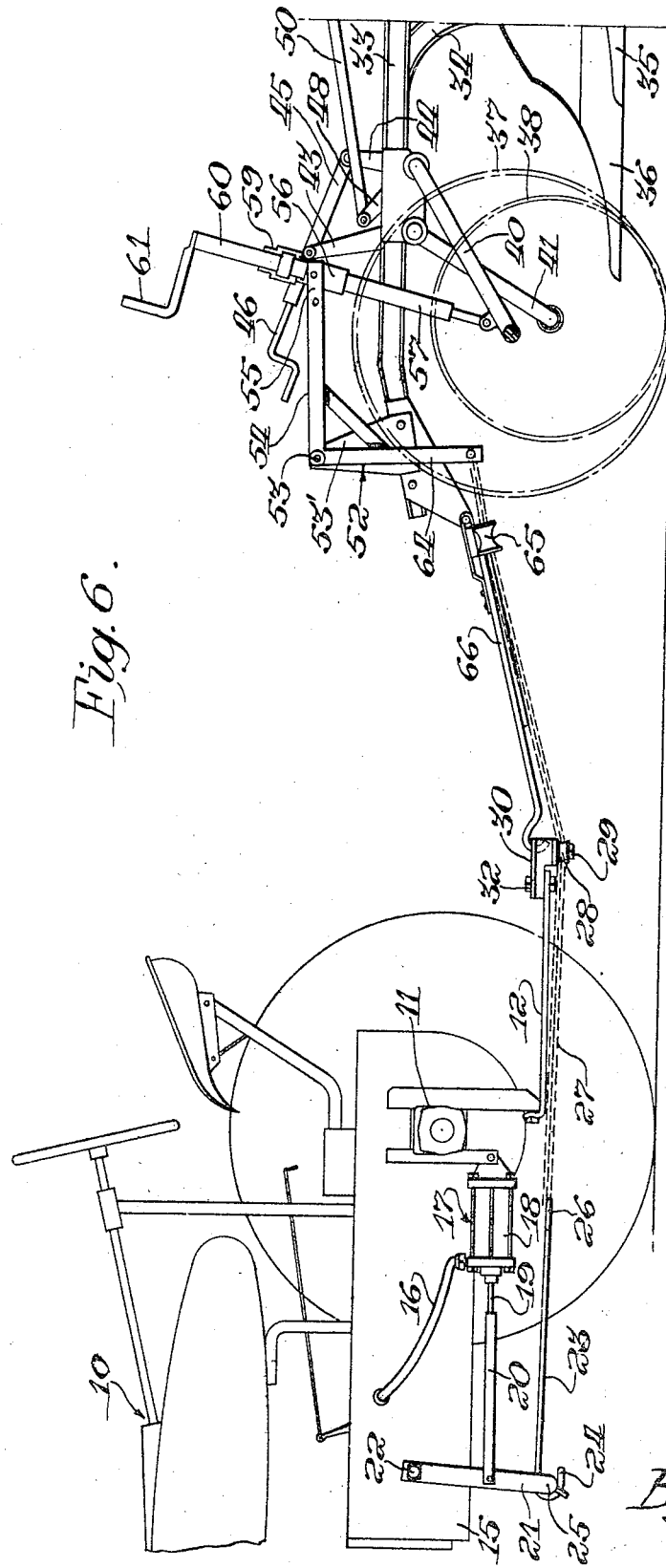
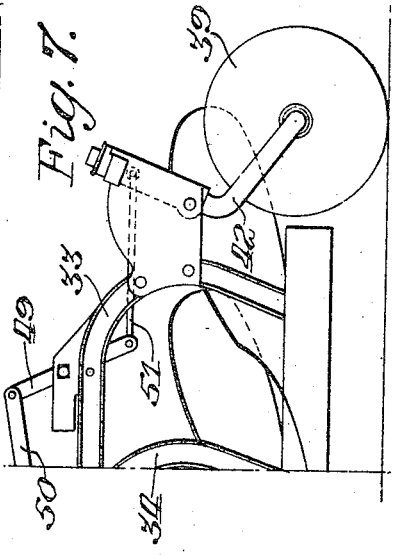
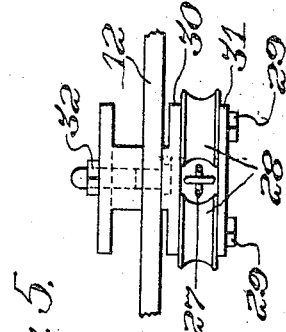
Inventor
Carl W. Mott Patented July 21, 1942

2,290,245

UNITED STATES PATENT OFFICE 2,290,245

POWER LIFT FOR IMPLEMENTS

Carl W. Mott, La Grange, Ill., assignor to International Harvester Company, a corporation of New Jersey Application July 12, 1940, Serial No. 345,146

7 Claims. (Cl. 97—50)

This invention relates to a power lift device. More specifically it relates to a power lift for a plow.

It is a general practice to lift a plow attached in trail-behind position to a tractor by means of a wheel power lift on the plow. The disadvantage with this type of lift is that under certain conditions it may be impossible for the wheel of the plow to obtain sufficient traction to cause the power lift to raise the plow. Consequently, it becomes desirable to employ some type of power lift which is not dependent upon traction for its successful operation.

An object of the present invention is to provide an improved power lift.

Another object is the provision of an improved power lift for a plow.

A further object is to provide an improved mode of lifting a plow connected to a tractor in trail-behind position.

Still another object is to provide means for lifting a plow trailing behind the tractor by the power of the tractor.

A still further object is the provision of an improved means for adjusting the height of an implement by means of power.

According to the present invention, a plow is attached at the rear of the tractor in the usual trail-behind position. Lifting of the plow is accomplished by means of a power-operated bail embracing the tractor body and a flexible connection extending from the bail back to the plow.

In the drawings:

Figure 1 is a side view of a tractor and a plow in plowing position with the novel power lift of the present invention applied thereto;

Figure 2 is a side view of the rear end of the plow in plowing position;

Figure 3 is a plan view of the tractor and the plow;

Figure 4 is an elevational view of the plow taken from the front;

Figure 5 is a detail view showing the manner in which the chain for lifting the plow is supported adjacent the connection of the plow to the tractor;

Figure 6 is a side view similar to Figure 1 showing the tractor and plow in raised position; and, Figure 7 is a side view of the rear end of the plow in raised position.

A tractor 10 has a rear axle 11 to which is attached the conventional U-shaped draw-bar by means of depending members 13 and 14. The tractor has a body 15 from the side of which extends a hose 16 from opposite sides of the body to fluid power devices 17 of the type shown in the patent to Lindgren No. 2,156,570, May 2, 1939. Each power device comprises essentially a cylinder 18 having a sleeve extension 19 and a piston, not shown, within the cylinder, a rod, also not shown, extending through the sleeve extension 19 and secured to a sleeve 20. The sleeve 20 embraces the sleeve extension 19. The forward ends of the sleeves 20 are connected to the sides of a U-shaped bail 21 pivotally secured at 22 to the side of the tractor and extending beneath the tractor. A rod 23 has a hooked end 24 engaging a base portion 25 of the U-shaped bail 21 well below the body of the tractor. The rear end of the rod 23 is formed in a loop 26 to which one end of a flexible element, such as a chain 27, is attached. The chain extends rearwardly between a pair of rollers 28 by which it is slidably supported. The rollers 28 are rotatably mounted on bolts 29 secured to the under side of a casting 30 carried on the draw-bar 12. A plate 31 engages the under side of the rollers 28 and extends between the rollers so as to hold the chain 27 between the rollers. The casting 30 is secured to the U-shaped draw-bar 12 by a bolt 32. The parts described up to this point, including the U-shaped bail 21, the rod 23, the chain 27, and the rollers 28 and the plate 31 which support the chain 27, are disclosed and claimed in the copending application of Carl W. Mott, Serial No. 321,154, filed February 28, 1940. In that application the means are illustrated for angling the gangs of a harrow. In the present application the invention is limited to the use of this means for adjusting the height of an implement, such as a plow or analogous implement, by means of power.

The plow shown in the drawings comprises essentially a pair of plow beams 33 and 34 to which are attached, respectively, plow elements 35 and 36. The plow is supported on a land wheel 37, furrow wheel 38, and a gauge wheel 39. The land wheel 37 is pivotally connected to the beams 33 and 34 by a crank axle 40. A crank axle 41 connects the furrow wheel 38 to the beams, and a crank axle 42 connects the gauge wheel 39 to the beam 33. The land wheel 37 and the furrow wheel 38 are interconnected by means of arms 43 and 44 extending respectively from the crank axles 40 and 41, and by an adjustable link 45, adjustable by means of a crank 46 and connecting the crank axles 40 and 41. The gauge wheel 39 is interconnected with the land wheel 37 by means of an arm 48 secured to the crank axle 40, a lever 49 pivotally mounted on the rear end of the beam 33, a link 50 connecting the arm 48 and the lever 49, and a link 51 connecting the crank axle 42 and the lever 49.

A bell crank 52 is pivotally supported, as at 53, on a standard 53' secured to the front end of the beam 33. One arm 54 of the bell crank extends generally rearwardly from the pivot point in the raised position of Figure 6 and is formed of spaced parts 55 which are connected on opposite sides of a trunnion member 56. The trunnion member 56 is secured to a sleeve 57 having an enlargement 58 at its upper end embraced by extensions 59 of a tubular member 60 having a crank 61. The connection of the tubular member 60 to the tubular member 57 by means of the enlargement 58 on the extension 59 is such as to permit the members relative movement of rotation but no relative axial movement. The tubular member 57 extends over a rod 62 pivotally connected at 63 to the crank axle 40. The rod 62 has a threaded end, not shown, which engages a threaded bore, also not shown, in the tubular member 60. By means of the parts described, it is possible to obtain an adjustment of the crank axle 40 relative to the bell crank 52. Rotation of the tubular member 60 by means of the crank 61 produces an axial movement of the rod 62 with respect to the tubular member 60 by virtue of the threaded engagement of the rod 62 and the tubular member 60. The position of the trunnion member 56 is changed, and consequently the distance between the trunnion and the pivot point 63 is varied.

The bell crank 52 has a generally downwardly extending arm 64 to the end of which is attached the chain 27. In the raised position, the end of the bell crank is adjacent a bell-mouthed guide 65 through which the chain 27 extends. The bell-mouthed guide 65 is secured to a hitch member 66 which connects the plow with the casting 30 on the draw-bar 12 of the tractor.

Raising of the plow from the position of Figure 1 to that of Figure 6 is effected by means of the U-shaped bail 21 and the chain 27. The fluid under pressure is supplied through the hoses 16 to the fluid power devices 17 so as to move the pistons to the left, and consequently the sleeves 20 move to the left, urging the U-shaped bail 21 forward. The rod 23 and the chain 27 also move forwardly and effect a clockwise rotation of the bell crank 54. The result is a downward movement of the arm 55 of the bell crank, a downward movement of the crank axle 40, and, consequently, a raising of the beams of the plow with respect to the wheels. When it is desired to lower the plow elements 35 and 36, pressure on the fluid hoses 16 is released, and the weight of the plow elements and beams causes the plow to go back into the position of Figure 1.

It will be apparent from the foregoing description that a new and novel means for adjusting the height of an implement, such as a plow, has been devised. By this means the power of the tractor is employed for raising the implement, and the connection through which the force to the raising is transmitted from the tractor to the implement is supported and confined adjacent the point where the implement is attached to the tractor, and also on the implement itself, so that there is no danger that the connection may become too loose or too tight in the adjusted position of the implement with respect to the tractor, or that the connection may become entangled with the implement itself during adjustment thereof.

It is the intention to limit the invention only within the scope of the appended claims.

What is claimed is:

1. In combination, a tractor having a body and a power plant having an outlet at one side of the body, an implement having a liftable part and connected at the rear of the body on generally the longitudinal center line of the body, and means for adjusting the height of the liftable part comprising rockable means mounted on the tractor, means connecting the power-plant outlet and a point on the rockable means generally in alinement with the said outlet longitudinally of the tractor, and means connecting the implement and a point on the rockable means generally on the longitudinal center line of the tractor and being supported adjacent the connection of the implement with the tractor.

2. The combination specified in claim 1, the said rockable means being mounted on an axis extending transversely of the tractor.

3. In combination, a tractor having a body and a power plant having an outlet at one side of the body, an implement having a liftable part and connected at the rear of the body on generally the longitudinal center line of the body, and means for adjusting the height of the liftable part comprising rockable means mounted on the tractor on a transverse axis, means connecting the power-plant outlet and a point on the rockable means generally in alinement with the said outlet longitudinally of the tractor and beneath the said transverse axis of the rockable means, and means connecting the implement and a point on the rockable means generally on the longitudinal center line of the tractor and beneath the said transverse axis of the rockable means.

4. In combination, a tractor having a power plant, a fluid device comprising a cylinder and a piston mounted therein, means connecting the power plant and the fluid device for effecting relative movement between the piston and the cylinder, an implement connected to the tractor and having a liftable part, and means connecting the implement and the fluid device for changing the height of the liftable part in response to relative movement between the piston and the cylinder, said last-mentioned means comprising a member pivotally mounted on the tractor and having a portion therebeneath and a flexible element connected to the said portion of the member and extending to the implement at generally the level of the said portion of the member.

5. The combination specified in claim 4, the flexible element of the said last-mentioned means being supported adjacent the connection of the implement with the tractor.

6. In combination, a tractor having a power plant and a rear axle, a fluid device comprising a cylinder and a piston mounted therein, means connecting the power plant and the fluid device for effecting relative movement between the piston and the cylinder, a draw-bar carried by the rear axle and extending therebelow, an implement pivotally connected to the draw-bar and having a liftable part, and means connecting the fluid device and the implement for effecting change in the height of the liftable part in response to relative movement between the piston and the part, said last mentioned means including a member pivotally mounted on the tractor and having a portion beneath the tractor and beneath and in front of the rear axle and a flexible element extending between the said portion of the member and the implement and beneath the draw-bar and being supported adjacent the pivotal connection of the implement with the draw-bar.

7. In combination, a tractor having a power plant, a rear axle, and a draw-bar depending therefrom, a plow comprising a beam, a wheel, a crank axle connecting the beam and the wheel, a bell crank pivotally mounted on the beam and having a downwardly extending arm and a horizontally extending arm, an adjustable link connecting the crank axle and the horizontally extending arm of the bell crank, and means connecting the tractor power plant and the plow for changing the height of the beam with respect to the wheel comprising a member pivotally mounted on the tractor and connected with the power plant and having a portion beneath the tractor, and a flexible element connecting the said portion of the member and the vertically extending arm of the bell crank and slidably supported by the tractor draw-bar and by the plow at a point adjacent the lower end of the vertically extending arm of the bell crank.

CARL W. MOTT.